United States Patent
Ouellette (12) 
(10) Patent No.: US 6,386,799 B1
(45) Date of Patent: May 14, 2002

(54) AIR CONVEYOR WITH AN ADJUSTABLE AIR FLOW CONTROL MECHANISM

(75) Inventor: Joseph F. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 9 days.

(21) Appl. No.: 09/697,522

(22) Filed: Oct. 26, 2000

(51) Int. Cl.7 ............................................... B65G 51/16

(52) U.S. Cl. .......................................... 406/26; 406/88

(58) Field of Search ........................... 406/26, 88, 192

(56) References Cited

U.S. PATENT DOCUMENTS

| | | | |
|---|---|---|---|
| 5,628,588 A | 5/1997 | Ouellette | |
| 6,287,055 B1 | * 9/2001 | Ouellette | 406/88 |
| 6,318,935 B1 | * 11/2001 | Ouellette | 406/83 |

* cited by examiner

Primary Examiner—Christopher P. Ellis
Assistant Examiner—Joe Dillon, Jr.
(74) Attorney, Agent, or Firm—Thompson Coburn LLP (57) ABSTRACT

An air flow control mechanism for a multi-channel air conveyor enables the flow rate of air ejected from air outlet orifices of inner channels of the multi-channel air conveyor to be adjusted without changing the flow of air ejected from air outlet orifices of the outer pair of air conveyor channels of the multi-channel air conveyor.

21 Claims, 7 Drawing Sheets

AIR CONVEYOR WITH AN ADJUSTABLE AIR FLOW CONTROL MECHANISM

BACKGROUND OF THE INVENTION (1) Field of the Invention

The present invention pertains to an air flow control mechanism for a multi-channel air conveyor that enables the flow rate of air ejected from air outlets of inner channels of the air conveyor to be adjusted without changing the flow of air ejected from air outlets of the outer channels of the air conveyor.

(2) Description of the Related Art

Air conveyors are typically employed in the rapid transport of empty plastic bottles of the type having an annular rim or a neck ring at the top of the bottle neck. A typical air conveyor includes a pair of flanges that are spaced from each other defining an elongated slot between the flanges. The slot between the spaced flanges defines a conveyor path or a channel of the air conveyor. The lateral spacings between the pairs of flanges of the conveyor channel is sufficiently large to enable a portion of the bottle neck just below the neck ring to pass through the spacing between the flanges with the bottle suspended from the top surfaces of the pairs of flanges by the neck ring resting on the top surfaces. A series of air jets or air outlet orifices are arranged along the longitudinal lengths of the pairs of flanges positioned above and/or below the flanges. A plenum of the air conveyor supplies a flow of air to the air outlet orifices. The air outlet orifices on the opposite sides of the channel are oriented so that air supplied from the plenum and ejected from the air outlet orifices will contact the plastic bottles and push the bottles along the conveyor path of the channel defined by the elongated slots between the pairs of flanges with the neck rings of the bottles sliding along the top surfaces of the pairs of flanges.

For air conveyors of considerable longitudinal length, conveyor sections are connected end-to-end so that the pairs of flanges of one conveyor section are aligned with the pairs of flanges of the adjacent conveyor section and the pairs of flanges, aligned end-to-end, define the conveyor path or the channel of the air conveyor.

A multi-channel air conveyor includes a multiple of channels and their associated pairs of flanges arranged laterally side-by-side, with the multiple of pairs of flanges extending longitudinally along the length of the multi-channel air conveyor, thereby defining a multiple of side-by-side conveyor paths or channels. Like a single channel air conveyor, a multi-channel air conveyor includes a series of air jets or air outlet orifices that are arranged along the longitudinal lengths of each of the pairs of flanges that define the channels of the multi-channel air conveyor. A plenum of the air conveyor supplies the flow of air to the air outlet orifices of the multiple channels.

For manufacturing convenience and to reduce costs, all of the air outlet orifices of each of the channels of a multi-channel air conveyor are typically supplied with a flow of air from the same air plenum positioned above the channels. The air outlet orifices on the opposite sides of each of the channels are oriented so that air supplied from the plenum and ejected from the air outlet orifices will contact the plastic bottles, pushing the bottles along the air conveyor channels defined by the pairs of conveyor flanges with the neck rings of the bottles sliding along the top surfaces of the pairs of flanges.

A drawback encountered with multi-channel air conveyors is that the side-by-side positioning of the slots or channels allows the interaction of jets of air ejected from the air outlet orifices of adjacent air conveyor channels. This is most evident in the inner air conveyor channels that are positioned between the outer pair of air conveyor channels that extend along the laterally opposite sides of the multi-channel conveyor. The air outlet orifices spacially arranged along the longitudinal lengths of the air conveyor channels are dimensioned to push plastic bottles along the channels at a desirable speed and at a desirable orientation of the bottles relative to the channels and the flanges defining the channels. However, with multi-channel air conveyors having a plurality of adjacent conveyor channels and their associated pairs of outlet orifices, the air ejected from pairs of outlet orifices along one conveyor channel will influence the air ejected from the air outlet orifices along an adjacent conveyor channel. This is most evident along the inner air conveyor channels or those channels that are positioned between the pair of air conveyor channels that extend along the laterally opposite sides of the multi-channel air conveyor. Each of the inner air conveyor channels will convey bottles that are pushed along the channels not only by the force of air ejected from the rows of air outlet orifices of the particular inner channel, but also by the force of some of the air ejected from the air outlet orifices of adjacent air conveyor channels. The outer air conveyor channels that extend along the laterally opposite sides of the multi-channel air conveyor are only influenced by air ejected from the air outlet orifices of the adjacent inner air conveyor channel. Therefore, the effect of air ejected from adjacent air conveyor channels on the bottles conveyed by the outer pair of air conveyor channels of the multi-channel air conveyor is not appreciable. However, the plastic bottles conveyed by the inner air conveyor channels are subjected to not only the force of air ejected from the air outlet orifices arranged along the particular inner air channel, but also a portion of the air ejected from air outlet orifices of air conveyor channels on both sides of the particular inner channel. This results in the bottles being conveyed along the inner air conveyor channels at a greater speed than intended and at a greater speed than the bottles conveyed along the outer air conveyor channels.

In addition, in single channel air conveyors it may be desirable to control the flow of air ejected from the air outlet orifices of a section of the channel to control the speed of bottles conveyed through the channel or to control the pressure exerted on a forward most bottle or bottles of a slug or series of bottles accumulated in the particular air conveyor channel. It may also be desirable to quickly adjust the flow of air ejected from air outlet orifices of the air conveyor channel depending on what size of bottle is being conveyed through the air conveyor channel.

What is needed to overcome these problems associated with single channel or multi-channel air conveyors is a mechanism by which the flow of air ejected through the air outlet orifices of the air conveyor channels of an air conveyor can be adjusted and reduced to thereby control the speed of the bottles conveyed through the air conveyor channels.

SUMMARY OF THE INVENTION

The air conveyor of the present invention overcomes the above described disadvantage associated with multi-channel air conveyors by providing an adjustable air flow control mechanism for a multi-channel air conveyor that can adjust the flow of air ejected from the air outlet orifices of the inner channels. In the preferred embodiment, the air flow control mechanism for the multi-channel air conveyor is employed with a multi-channel air conveyor of the type described earlier. The multi-channel air conveyor is assembled in sections. Each section has a longitudinal length along which the multi-channels extend and a lateral width across which the multi-channels are arranged side-by-side. A base of the air conveyor is connected to an air plenum that extends across the top of the base. Pluralities of pairs of side walls extend downwardly from the base and support pairs of mutually opposed, laterally spaced flanges. The spacings between the pairs of flanges define the conveyor slots or the conveyed paths of the air channels of the multi-channel air conveyor. Air ducts extend through each of the side walls between air inlet orifices that open through the top of the base and air outlet orifices that open near the bottoms of the side walls. The air outlet orifices are oriented to direct a flow of air ejected from the air outlet orifices toward the slot defined by the pairs of flanges supported between each pair of side walls. Thus, air ejected from the air outlet orifices of each of the air conveyor channels will push plastic bottles supported by their neck rings from the opposed pairs of flanges of each air conveyor channel downstream through the air conveyor channel. As stated above, the speed at which the plastic bottles are pushed down the air conveyor channels is determined by the force of the air ejected from the air outlet orifices of each of the channels.

The multi-channel air conveyor of the invention differs from prior art multi-channel air conveyors in that it includes an adjustable air flow control mechanism. In the preferred embodiment, the control mechanism only adjusts the air flow of the inner air conveyor channels. However, although the adjustable air flow control mechanism is described as adjusting the air flow of the inner air conveyor channels, a similar mechanism could be used to adjust the air flow of the outer air conveyor channels independently of the inner air conveyor channels. In addition, the air flow control mechanism of the invention may be employed in adjusting the air flow of single channel air conveyors to adjust the speed of bottles conveyed through these air conveyors and to adjust the force exerted on the forward most bottles of a slug or sequence of bottles that are temporarily held back in a section of an air conveyor, whether a single channel or multi-channel air conveyor.

To adjust the flow of air ejected from the air outlet orifices of the inner air channels so that the speed of bottles conveyed through the inner air channels substantially matches that of bottles conveyed through the outer air channels, the adjustable air flow control mechanism of the invention employs a throttle plate that overlays a portion of the top of the base inside the air plenum. In this particular application, the plate has a lateral width that overlays only the inner air channels of the air conveyor. However, as explained earlier, it could also overlay outer channels to adjust air flow through these channels. The plate lateral width does not extend over the outer channels of the air conveyor and therefore operation of the adjustable air flow control mechanism will not change the flow of air through the air outlet orifices of the outer channels of the air conveyor. The plate is provided with longitudinal rows of throttle openings that are arranged on the plate to correspond to the positions of the air inlet orifices of the inner air channels of the conveyor. The plate can slide across the interior surface of the air plenum between first and second positions of the plate.

In the first position of the plate, the throttle openings in the plate are aligned with the air inlet orifices of the inner air channels. In this first position of the plate it does not restrict the flow of air supplied by the air plenum through the air inlet orifices of the inner air channels. The air outlet orifices of the inner air channels as well as the air outlet orifices of the outer air channels will eject substantially the same flow of air. However, as the plate is moved from its first position toward its second position, the throttle openings of the plate gradually move away from their alignment with the air inlet orifices of the inner air channels and progressively restrict the flow of air supplied by the air plenum to the air inlet orifices of the inner air channels. This reduces the flow of air ejected from the air outlet orifices of the inner air channels. In this manner, the adjustable air flow control mechanism can be used to adjust the air flow ejected from the air outlet orifices of the inner air channels so that the speed of plastic bottles conveyed through the inner air channels can be substantially matched to that of the speed of bottles conveyed through the outer air channels.

The throttle plate of the air control mechanism is moved between its first and second positions relative to the air inlet orifices of the air channels by a manually operated transfer assembly at one end of the throttle plate. The transfer assembly includes a shaft mounted for rotation to the air plenum that extends laterally across the air plenum. The shaft has a manual handle mounted to one end of the shaft outside the plenum. Inside the plenum, a generally cylindrical cam is mounted eccentrically on the shaft. A cam receiver block is mounted on the throttle plate. The cam receiver block has a cam slot and the cam mounted on the shaft is received in the cam slot. Manual rotation of the manual handle in opposite directions causes the cam to slide in the cam slot in opposite directions which in turn causes the throttle plate to move reciprocally between its first and second positions relative to the air inlet orifices of the inner air conveyor channels. In this manner, the positions of the throttle openings of the throttle plate are adjusted between their first and second positions relative to the air inlet orifices of the inner conveyor slots, thereby adjusting the flow of air through the air ducts and air outlet orifices of the inner air conveyor channels.

The opposite end of the throttle plate is held down against the interior surface of the air conveyor base by an idler shaft. The throttle plate can be constructed of one continuous longitudinal plate, or alternatively constructed of separate plate sections connected end-to-end. In addition, air flow control mechanisms of adjacent air conveyor sections that are connected end-to-end can be interconnected by chain and sprocket connections so that controlling the positioning of one throttle plate in one conveyor section will also control the positioning of a throttle plate in an adjacent conveyor section.

BRIEF DESCRIPTION OF THE DRAWINGS

Further features of the present invention are set forth in the following detailed description of the preferred embodiment of the invention and in the drawing figures wherein.

DETAILED DESCRIPTION OF THE PREFERRED EMBODIMENT

Figure 1:
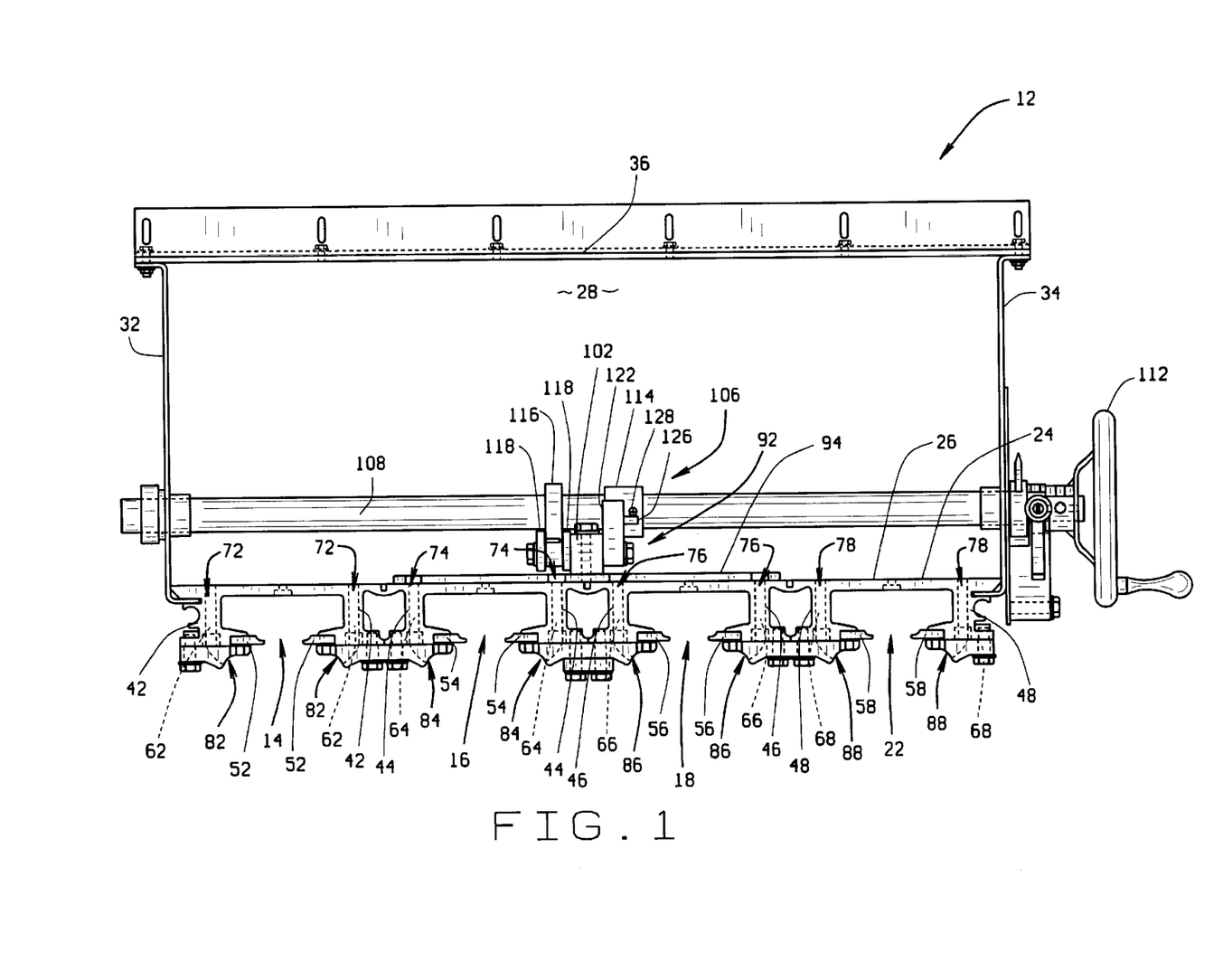
FIG. 1 is an end view of a section of a multi-channel air conveyor employing the adjustable air flow control mechanism of the invention.

In the preferred embodiment, the air conveyor with the adjustable air flow control mechanism is a multi-channel air conveyor that replicates single channel air conveyors of the type disclosed in the U.S. Pat. No. 5,628,588, of Ouellette issued May 13, 1997 and incorporated herein by reference. However, as explained earlier, the adjustable air flow control mechanism may be employed with single channel air conveyors to adjust the speed of bottles conveyed through the single channel air conveyors and also to adjust the force or pressure exerted on the forward-most bottles of a slug or series of bottles held back at a particular section of the air conveyor. FIG. 1 shows an end view of one section of a multi-channel air conveyor 12 having four side-by-side channels 14,16,18,22. As explained earlier, what is meant by a multi-channel air conveyor is a conveyor having a multiple of bottle conveying channels that extend along the longitudinal length of the conveyor or the conveyor section and are arranged laterally side-by-side. In the illustrated embodiment of the multi-channel air conveyor 12 shown in the drawing figures, the air conveyor is comprised of two inner channels 16,18 and two outer channels 14,22. As seen in FIG. 1, the two outer channels 14,22 are those that extend along the laterally opposite sides of the conveyor length. The inner channels 16,18 are those that are positioned between the outer channels and between the outer lateral sides of the conveyor length. Although two inner channels are shown in FIG. 1, the air flow control mechanism of the invention can be employed with multi-channel air conveyors having only one inner channel or having more than two inner channels. The control mechanism could also be used with single channel air conveyors as explained earlier, and different control mechanisms could be employed to provide different controls of the air flow supplied to different channels of a multi-channel air conveyor.

The multi-channel air conveyor 12 includes a base 24 of the air conveyor that extends along the longitudinal length of the conveyor and across the lateral width of the conveyor. The base 24 is connected with and forms a bottom interior surface 26 of an air plenum 28 on top of the base. The air plenum is comprised of a pair of laterally spaced side walls 32,34 that extend the longitudinal length of the conveyor and a top wall 36 that is connected to the top edges of the side walls and also extends for the longitudinal length of the conveyor. The base 24, the pair of side walls 32,34 and the top wall 36 enclose the interior volume of the air plenum 28. The air plenum interior volume is supplied by a source of air (not shown) that is directed to the air channels 14,16,18,22 to move plastic bottles through the channels in a manner to be described.

Pluralities of pairs of side walls 42,44,46,48 depend downwardly from the base 24 with each pair of side walls defining one of the respective air conveyor channels 14,16, 18,22 therebetween. Each of the pairs of side walls extends the entire length of the air conveyor. Each of the pairs of side walls supports a pair of mutually opposed, laterally spaced flanges 52,54,56,58. The lateral spacings between the pairs of flanges define the conveyor slots or the conveyed paths of the air channels of the multi-channel air conveyor. The pairs of flanges 52,54,56,58 extend along the longitudinal length of the channels. The spacings between the opposed flanges of each pair are adjustable and are determined to allow a plastic bottle to be suspended between the pair of flanges by its neck ring and easily slide along the flanges down the conveyed path of the channels.

Air ducts 62,64,66,68 extend downwardly through each of the pairs of side walls 42,44,46,48 between air inlet orifices 72,74,76,78 of the air ducts that open through the top of the base 24, and air outlet orifices 82,84,86,88 that open near the bottoms of the side walls. The air outlet orifices are spacially arranged along the longitudinal lengths of the air channels and are oriented to direct a flow of air ejected from the air outlet orifices toward the slots defined by the pairs of flanges 52,54,56,58 supported between each pair of side walls. Thus, the air ejected from the pairs of air outlet orifices 82,84,86,88 of each of the air conveyor channels 14,16,18,22 will push plastic bottles supported by their neck rings from the opposed pairs of flanges 52,54,56,58 of each air conveyor channel downstream through the air conveyor channel. As stated earlier, the speed at which the plastic bottles are pushed down the air conveyor channels is determined by the force of the air ejected from the air outlet orifices of each of the channels. The problem encountered in prior art multi-channel air conveyors is that the air ejected from the air outlet orifices 82,88 of the outer air conveyor channels 14,22 will also contribute to the force of air ejected from the air outlet orifices 84,86 of the inner air conveyor channels 16,18 and the air flows of air ejected from inner air conveyor channels will contribute to each other causing the bottles conveyed in the inner air conveyor channels to travel at a greater speed than that of the bottles conveyed through the outer air conveyor channels 14,22.

To overcome the above-described disadvantage of prior art multi-channel air conveyors, the multi-channel air conveyor 12 of the invention includes an adjustable air flow control mechanism 92. The air flow control mechanism 92 adjusts the air flow through the air outlet orifices 84,86 of the inner air conveyor channels 16,18 without changing the air flow through the air outlet orifices 82,88 of the outer air conveyor channels 14,22. Although the air flow control mechanism 92 will be described as controlling the flow of air through the air outlet orifices 84,86 of two inner air conveyor channels 16,18 shown in the illustrated embodiment of the drawing figures, with slight modifications the air flow control mechanism could be operated to control the air flow through air outlet orifices of one inner air conveyor channel or of more than two inner air conveyor channels.

The air flow control mechanism 92 includes a throttle plate 94 that overlays a portion of the base top surface or the interior surface 26 of the air plenum 28. As seen in the drawing figures, the throttle plate 94 is a thin plate that has a longitudinal length that extends the entire longitudinal length of the air conveyor section and has a lateral width that overlays the air inlet orifices 74,76 of the two inner air conveyor channels 16,18. However, in certain applications the length of the throttle plate may be desired to be shorter. The plate lateral width does not extend over the air inlet orifices 72,78 of the two outer air conveyor channels 14,22 and therefore the operation of the adjustable air flow control mechanism to be described will not change the flow of air through the air outlet orifices 82,88 of the two outer air conveyor channels 14,22. The plate 94 is provided with longitudinal rows of pairs of throttle openings 96,98 that are spacially arranged in positions on the plate that correspond to the positions of the air inlet orifices 74,76 of the two inner air conveyor channels 16,18. The plate overlaying the interior surface 26 of the air plenum can slide across the interior surface between first and second positions of the plate relative to the air inlet orifices 74,76 of the two inner air channels 16,18. In the first position of the plate, the throttle openings 96,98 of the plate are aligned with the air inlet orifices 74,76 of the two inner air conveyor channels 16,18. In this first position of the plate it does not restrict the flow of air supplied by the air plenum 28 through the air inlet orifices 74,76 of the two inner air conveyor channels 16,18. The air outlet orifices 84,86 of the inner air channels 16,18 as well as the air outlet orifices 82,88 of the outer air channels 14,22 will eject substantially the same flow of air when the throttle plate 94 is in its first position. However, as the plate 94 is moved from its first position toward its second position, the throttle openings 96,98 of the plate gradually move away from their position of alignment with the air inlet orifices 74,76 of the inner air conveyor channels 16,18 and progressively restrict the flow of air supplied by the air plenum 28 to the air inlet orifices 74,76 of the inner air channels 16,18. This reduces the flow of air ejected from the air outlet orifices 84,86 of the inner air channels 16,18. In this manner, the adjustable air flow control mechanism can be used to adjust the air flow ejected from the air outlet orifices 84,86 of the inner air channels 16,18 so that the speed of plastic bottles conveyed through the inner air channels 16,18 can be substantially matched to that of the speed of bottles conveyed through the outer air channels 14,22.

Although the throttle plate 94 could be moved toward its second position to the extent that the throttle openings 96,98 of the plate are completely displaced from the air inlet orifices 74,76 of the inner air channels 16,18 blocking all flow of air through the air ducts and the air outlet orifices 84,86 of the inner air channels 16,18, this would likely not occur in using the adjustable air flow control mechanism where it is desirable to convey plastic bottles through all of the air channels of the multi-channel conveyor.

Figure 2:
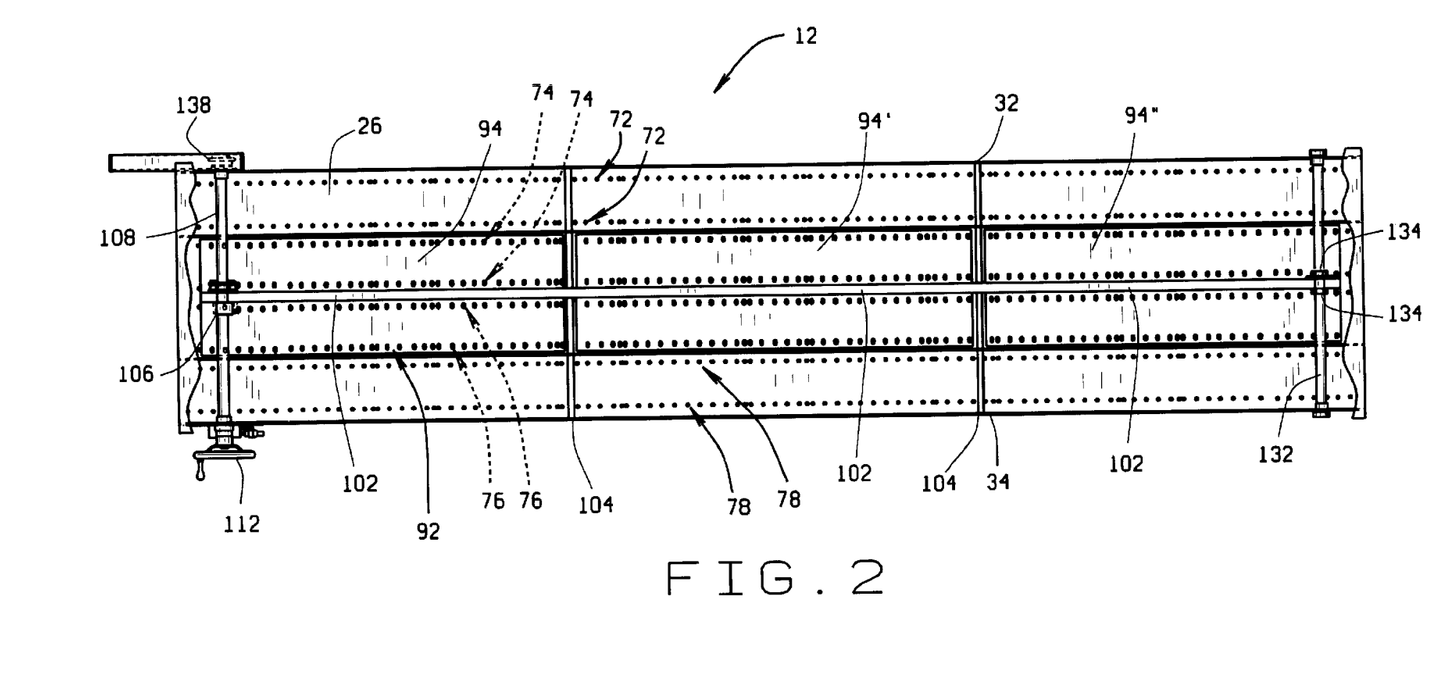
FIG. 2 is a top plan view of the multi-channel air conveyor section employing the air flow control mechanism of the invention.
Figure 3:
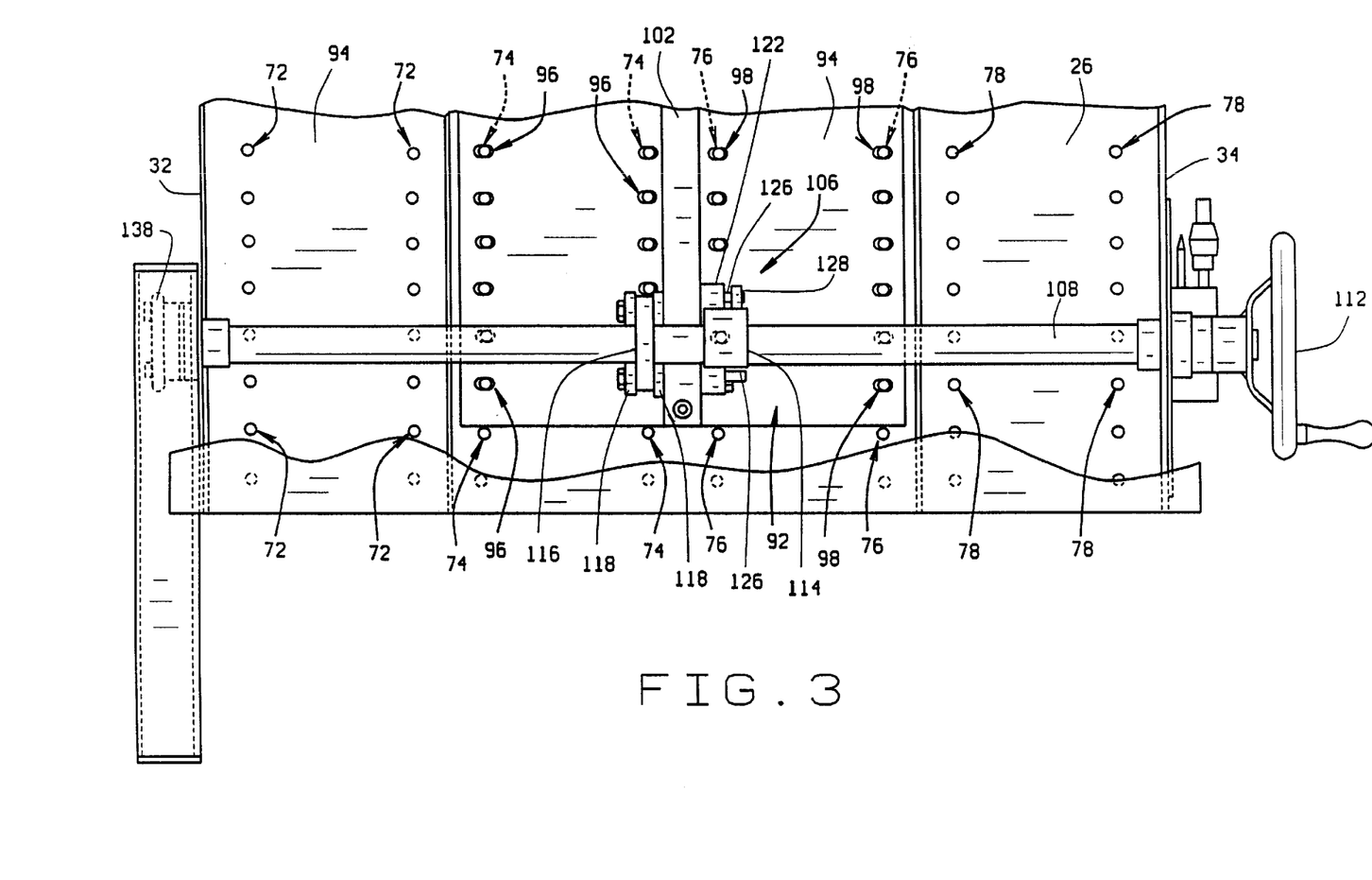
FIG. 3 is a partial plan view of the air flow control mechanism of the invention.

As seen in FIG. 2, the throttle plate 94 is actually comprised of three plates 94,94',94" that are connected together longitudinally in line by a center bar 102. The connection by the center bar 102 enables all three plate sections to reciprocate longitudinally between their first and second positions together. The center bar 102 is connected over the top surfaces of the three plate sections and also spans connector bars 104 between sections of the multi-channel air conveyor 12 that connect sections together end-to-end. In this manner, the plate center bar 102 enables the three plate sections 94,94',94" to reciprocate together longitudinally between their first and second positions relative to the air outlet orifices 84,86 in adjacent sections of the air conveyor.

The throttle plate 94, as well as its other two sections, 94',94", is moved between its first and second positions relative to the air inlet orifices 74,76 of the two inner air channels 16,18 by a manually operated transfer assembly 106 provided at one end of the throttle plate. The transfer assembly includes a shaft 108 that is mounted for rotation through the side walls 32,34 of the air plenum. The shaft 108 extends laterally across one end of the throttle plate 94. The shaft has a manual handle or hand wheel 112 mounted to one end of the shaft outside the air plenum 28. A generally cylindrical cam 114 is mounted eccentrically on the shaft 108 and is positioned on one side of the plate center bar 102. A cylindrical collar 116 is also mounted on the shaft 108 on the opposite side of the center bar 102 from the cam 114. A spaced pair of flanges 118 are mounted on a side of the plate center bar 102 opposite the cam 114 and on opposite sides of the shaft collar 116. The sliding engagement of the flanges 118 on opposite sides of the collar 116 centers the throttle plate 94 in the air conveyor and laterally centers the throttle plate openings 96,98 relative to the air intlet orifices 74,76 of the two inner air channels 16,18.

Figure 4:
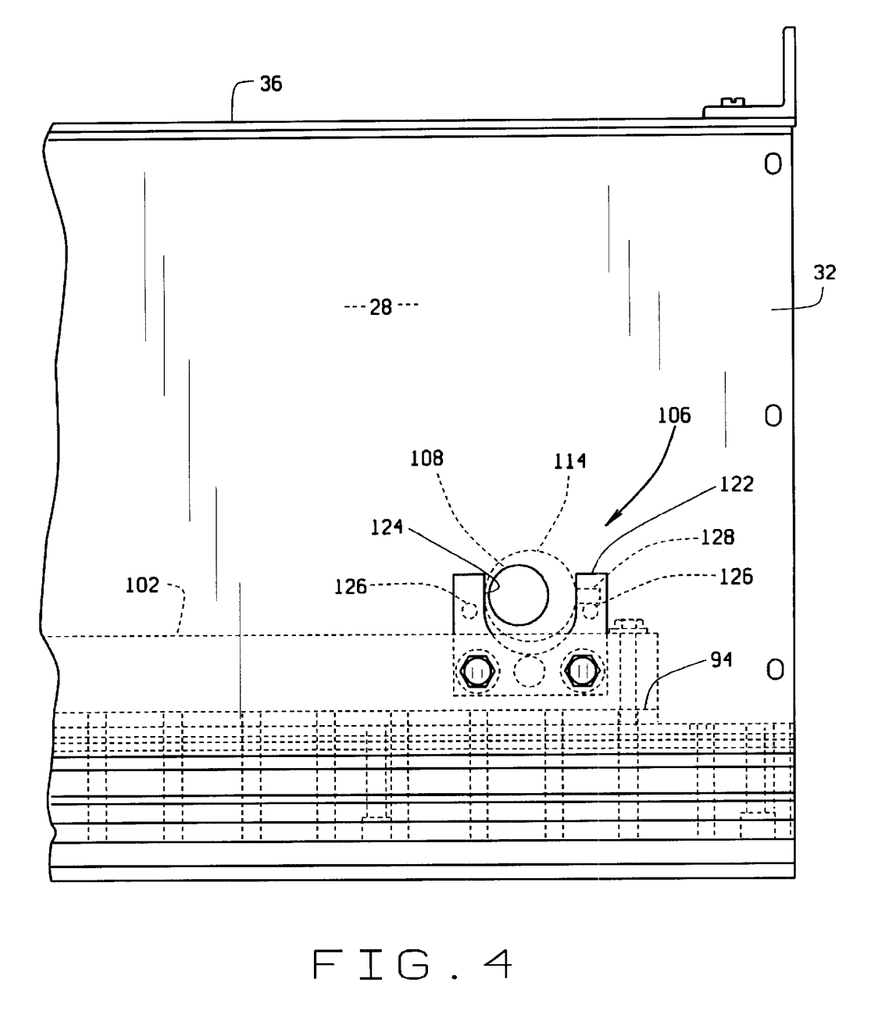
FIG. 4 is a partial side elevation view of the transfer mechanism of the air flow control mechanism of the invention.
Figure 5:
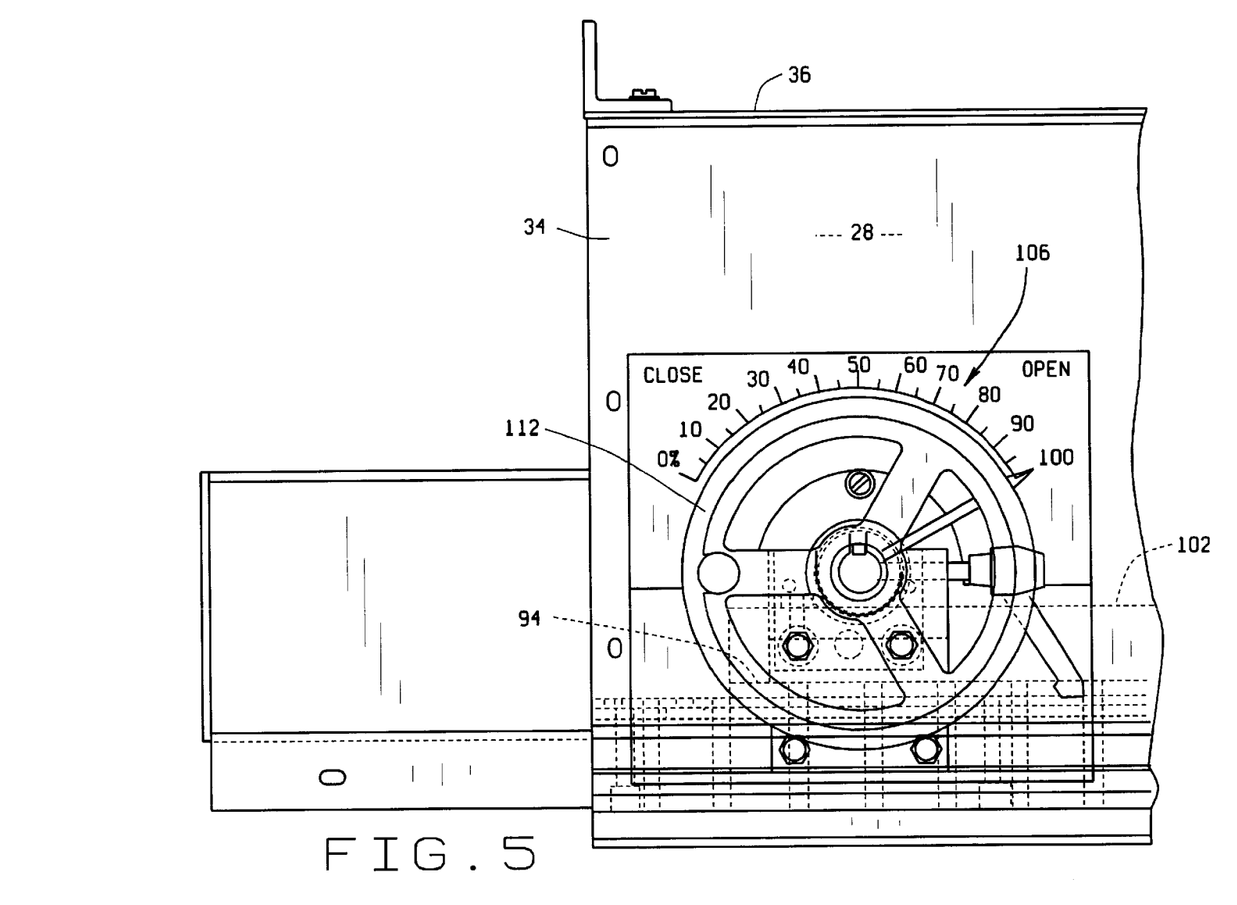
FIG. 5 is a side elevation view of the manual adjustment handle of the control mechanism.
Figure 6:
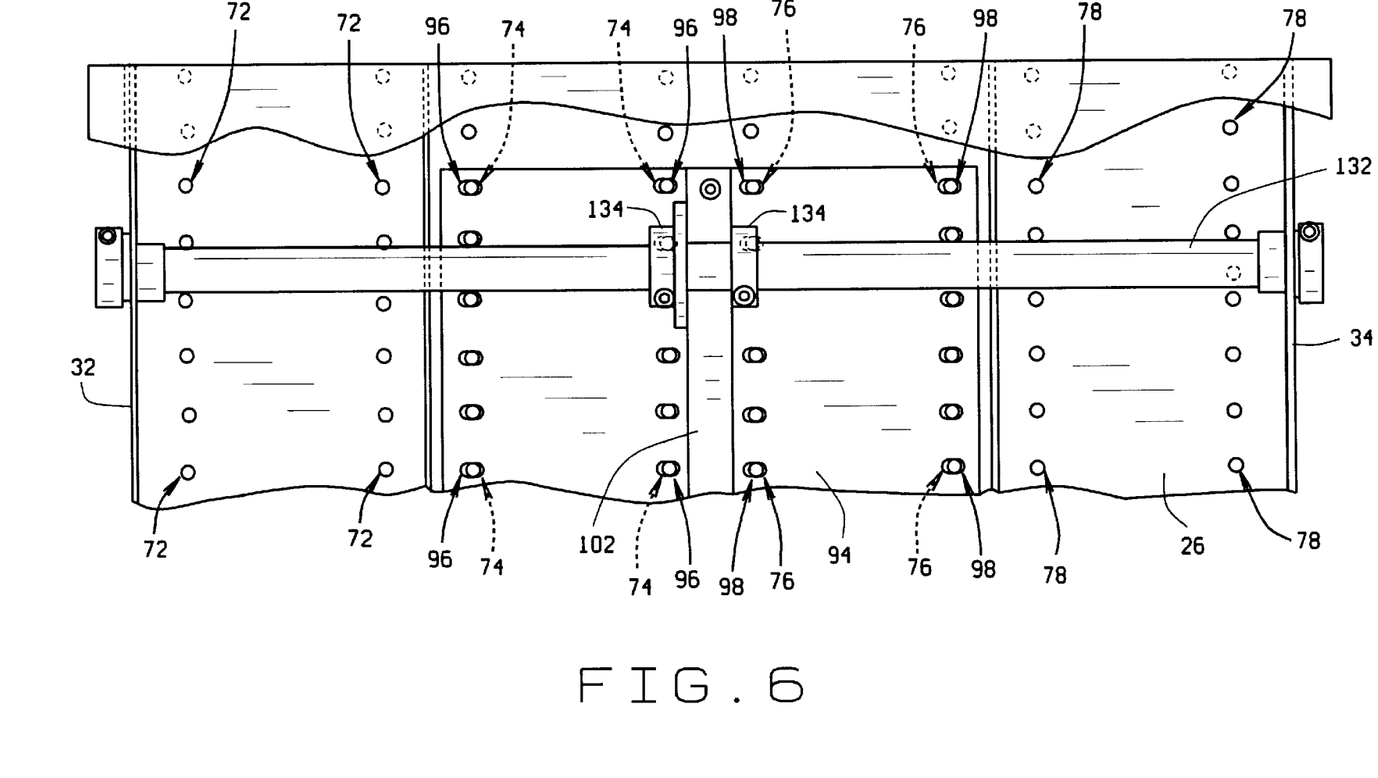
FIG. 6 is a partial plan view of a hold down bar of the air flow control mechanism.
Figure 7:
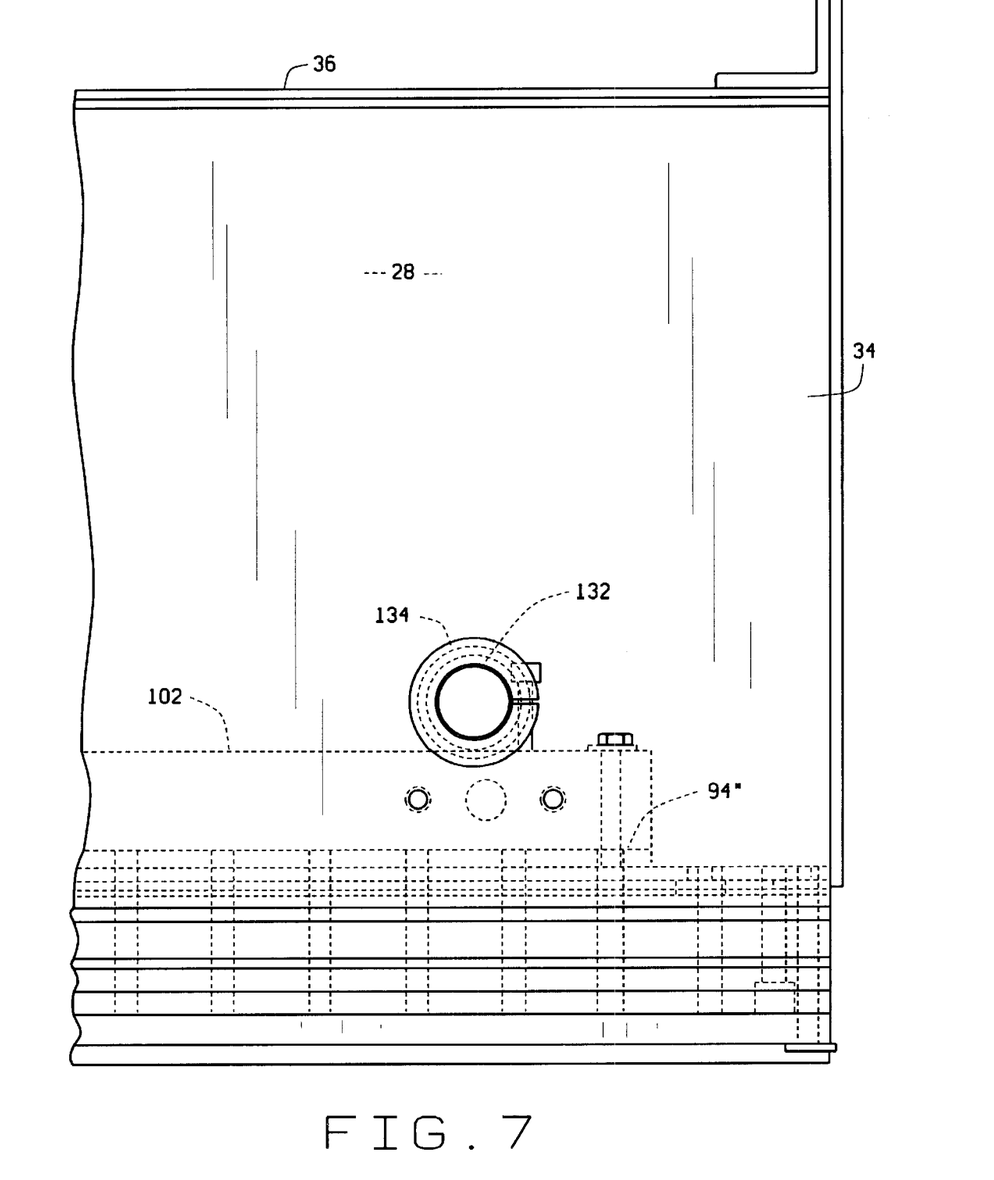
FIG. 7 is a partial side elevation view of the hold down bar of FIG. 6.

A cam receiver block 122 is mounted on the center bar 102 on the opposite side of the bar from the pair of flanges 118. The cam receiver block 122 has a cam slot 124 and the cam 114 mounted on the shaft 108 is received in the cam slot 124. A pair of stop pegs 126 project outwardly from a side of the cam receiver block 122 opposite the plate center bar 102. A cam post 128 projects outwardly from the cam 114 to an extent where it will engage with the stop pegs 126 as the cam is rotated, thereby defining two stop positions for the cam. Manual rotation of the hand wheel 112 will cause the cam 114 to rotate in the cam slot 124 with the rotation being limited by engagement of the cam post 128 with the two stop pegs 126. As seen in FIG. 4, as the cam 114 is rotated by the shaft 108, it will slide in the cam slot 124 and the eccentricity of the cam will cause the cam receiver block 122 to reciprocate linearly as viewed in FIG. 4, thereby moving the throttle plate 94 between its first and second positions. In viewing FIG. 4, the throttle plate 94 is shown in its first position. Rotating the hand wheel, shaft and cam 114 on the shaft counterclockwise will cause the cam receiver block 122 to move to the left until the cam post 128 engages the stop peg 126 on the left side of the cam receiver block. This will cause the throttle plate 94 to move to the left from the first position shown in FIG. 4 to its second position. In this manner, the positions of the throttle openings 96,98 of the throttle plate are adjusted between their first and second positions relative to the air inlet orifices 74,76 of the two inner air conveyor channels 16,18, thereby adjusting the flow of air through the air ducts and the air outlet orifices 84,86 of the two inner air conveyor channels 16,18. Instead of the hand wheel, movement of the throttle plate could be automatically controlled by a solenoid or other similar device connected to the plate and responsive to air flow sensors or pressure sensors in the air plenum.

In the preferred embodiment, the manually operated transfer mechanism 106 that controls the positioning of the throttle plate 94 is positioned at one end of the longitudinal length of the conveyor section and at one end of the longitudinal length of the throttle plate as shown in FIG. 2. The manually operated transfer mechanism could also be positioned at another position along the length of the throttle plate. The opposite end of the throttle plate is held down against the interior surface of the air conveyor base by an idler shaft 132. The idler shaft 132 is also mounted to the air plenum side walls 32,34. A pair of collars 134 are mounted on the idler shaft on opposite sides of the plate center bar 102. Thus, the pair of collars 134 also function to maintain the plate center bar 102 and the throttle plate 94 in a centered position in the air conveyor plenum 28. In addition, positioning the idler shaft 132 just above the plate center bar 102 holds the plate center bar and the throttle plate 94 down on the interior surface 26 of the air plenum during shipment and use.

As stated earlier, the throttle plate can be constructed of one continuous longitudinal plate, or alternatively constructed of separate plate sections connected end-to-end as shown in FIG. 2. In addition, air flow control mechanisms 106 of adjacent air conveyor sections that are connected end-to-end can be interconnected by a chain (not shown) looped over a sprocket 138 provided on an end of the transfer mechanism shaft 108 opposite the hand wheel 112 and around a like sprocket of an adjacent air conveyor section. With such a chain and sprocket connection, controlling the positioning of one throttle plate in one conveyor section will also control the positioning of a throttle plate in an adjacent conveyor section.

While the present invention has been described by reference to a specific embodiment, it should be understood that modifications and variations of the invention may be constructed without departing form the scope of the invention defined in the following claims.

What is claimed:

1. An air conveyor with an adjustable air flow control comprising:

an air plenum having a longitudinal length defining a conveyor path of the air conveyor and having a lateral width, the air plenum having a surface with a plurality of air inlet orifices; and an air control device mounted on the air plenum surface for movement of the air control device between first and second positions of the air control device relative to the air plenum surface, the air control device having a plurality of throttle openings and the throttle openings are arranged on the air control device where the throttle openings are aligned with the air inlet orifices when the air control device is moved to its first position and the throttle openings are not aligned with the air inlet orifices when the air control device is moved to its second position.

2. The air conveyor of claim 1, wherein:

the air plenum surface has laterally opposite edges that extend the longitudinal length of the air plenum, the plurality of air inlet orifices are arranged in a plurality of laterally spaced, longitudinal rows of air inlet orifices between the opposite edges of the air plenum surface, and throttle openings of the air control device do not align with rows of air inlet orifices adjacent the opposite edges of the air plenum surface when the air control device is moved to its first position.

3. The air conveyor of claim 1, wherein:

the air plenum is one of a plurality of air plenums that are arranged end-to-end.

4. The air conveyor of claim 1, wherein:

a pair of laterally spaced flanges are connected with the air plenum, the lateral spacing of the flanges defines a conveyor slot between the flanges that extends along the conveyor path, and a plurality of air outlets are arranged along the pair of flanges and communicate with the air inlet orifices.

5. The air conveyor of claim 4, wherein:

the pair of laterally spaced flanges are one pair of a plurality of pairs of laterally spaced flanges that are connected with the air plenum in a side-by-side arrangement.

6. The air conveyor of claim 1, wherein:

the air plenum surface is a bottom surface of the air plenum and the air control device includes a plate in the air plenum with the throttle openings on the plate, and the plate is mounted on the air plenum surface for sliding movement between the first and second positions of the air control device.

7. The air conveyor of claim 6, wherein:

the plurality of air inlet orifices on the air plenum surface are arranged in a plurality of laterally spaced pairs of longitudinal rows of air inlet orifices and the plurality of throttle openings on the plate are arranged in a plurality of laterally spaced pairs of longitudinal rows of throttle openings that align with air inlet orifices when the plate is in the first position of the air control device and are not aligned with the air inlet orifices when the plate is in the second position of the air control device.

8. The air conveyor of claim 7, wherein:

the air plenum surface has opposite lateral edges and the pairs of longitudinal rows of air inlet orifices include outer pairs of rows adjacent the opposite lateral edges of the air plenum surface and at least one inner pair of rows between the outer pairs of rows, and the plate overlays the at least one inner pair of rows and does not overlay the outer pairs of rows.

9. The air conveyor of claim 6, wherein:

a manual handle is mounted for rotation on the air plenum and a transfer mechanism is connected between the handle and the plate that converts rotary movement of the handle to linear movement of the plate.

10. The air conveyor of claim 9, wherein:

the transfer mechanism includes a shaft mounted for rotation on the air plenum with the manual handle mounted on the shaft, a cam mounted on the shaft and a cam slot on the plate and receiving the cam whereby rotating the manual handle in opposite directions rotates the shaft and cam in opposite directions and rotation of the cam in opposite directions causes linear reciprocating movement of the cam slot and plate in opposite directions, thereby causing the plate to move between the first and second positions of the air control device.

11. An air conveyor with an adjustable air flow control comprising:

a plurality of longitudinal channels that are arranged laterally side-by-side, each channel having an inverted U-shape defined by a top wall and a pair of laterally spaced side walls below the top wall;

pairs of mutually opposed, laterally spaced flanges projecting from each pair of side walls into each channel, the pairs of flanges defining longitudinal conveyor path slots therebetween;

pairs of air ducts extending through each pair of side walls between air inlet orifices of the ducts and air outlet orifices of the ducts that open into the channels defined by the pair of side walls;

and an air control device mounted over at least some of the air inlet orifices for movement of the air control device between first and second positions of the air control device relative to the air inlet orifices, the air control device having a plurality of throttle openings and the throttle openings are arranged on the air control device where the throttle openings are aligned with air inlet orifices of the air conveyor when the air control device is moved to its first position and the throttle openings are not aligned with the air inlet orifices when the air control device is moved to its second position.

12. The air conveyor of claim 11, wherein:

the plurality of channels includes a pair of outer channels at laterally opposite sides of the air conveyor and at least one inner channel between the outer channels, and the air control device is mounted over the air inlet orifices of the at least one inner channel and is not mounted over the air inlet orifices of the pair of outer channels.

13. The air conveyor of claim 12, wherein:

the at least one inner channel is one of a plurality of inner channels between the pair of outer channels and the air control device is mounted over the air inlet orifices of the plurality of inner channels.

14. The air conveyor of claim 11, wherein:

the plurality of longitudinal channels are connected with an air plenum that supplies the air inlet orifices of the channels with an air flow, the air plenum has an interior volume and an interior surface within the interior volume and the plurality of air inlet orifices are in the interior surface of the air plenum.

15. The air conveyor of claim 14, wherein:

the air control device is mounted on the interior surface inside the air plenum.

16. The air conveyor of claim 14, wherein:

the air plenum interior surface has laterally opposite edges that extend along the longitudinal channels, the air inlet orifices of each of the channels are arranged in pairs of laterally spaced, longitudinal rows of air inlet orifices between the opposite edges of the interior surface, and the throttle openings of the air control device do not align with pairs of longitudinal rows of air inlet orifices adjacent the laterally opposite edges of the air plenum interior surface when the air control device is moved to its first position.

17. The air conveyor of claim 14, wherein:

the air plenum surface is a bottom surface of the air plenum and the air control device includes a plate in the air plenum with the throttle openings on the plate, and the plate is mounted on the air plenum surface for sliding movement between the first and second positions of the air control device.

18. The air conveyor of claim 17, wherein:

the plurality of air inlet orifices on the air plenum surface are arranged in a plurality of laterally spaced pairs of longitudinal rows of air inlet orifices and the plurality of throttle openings on the plate are arranged in a plurality of laterally spaced pairs of longitudinal rows of throttle openings that align with air inlet orifices when the plate is in the first position of the air control device and are not aligned with the air inlet orifices when the plate is in the second position of the air control device.

19. The air conveyor of claim 18, wherein:

the air plenum surface has opposite lateral edges and the pairs of longitudinal rows of air inlet orifices include outer pairs of rows adjacent the opposite lateral edges of the air plenum surface and at least one inner pair of rows between the outer pairs of rows, and the plate overlays the at least one inner pair of rows and does not overlay the outer pairs of rows.

20. The air conveyor of claim 17, wherein:

a manual handle is mounted on the air plenum for rotation and a transfer mechanism is connected between the handle and the plate that converts rotary movement of the handle to linear movement of the plate.

21. The air conveyor of claim 20, wherein:

the transfer mechanism includes a shaft mounted for rotation on the air plenum with the manual handle mounted on the shaft, a cam mounted on the shaft and a cam slot on the plate and receiving the cam whereby rotating the manual handle in opposite directions rotates the shaft and cam in opposite directions and rotation of the cam in opposite directions causes linear reciprocating movement of the cam slot and plate in opposite directions thereby causing the plate to move between the first and second positions of the air control device.

* * * * *